March 9, 1965 K. B. HOLSTEBROE 3,172,547
APPARATUS FOR STACKING ARTICLES ON PALLETS
Filed Dec. 7, 1961 4 Sheets-Sheet 3
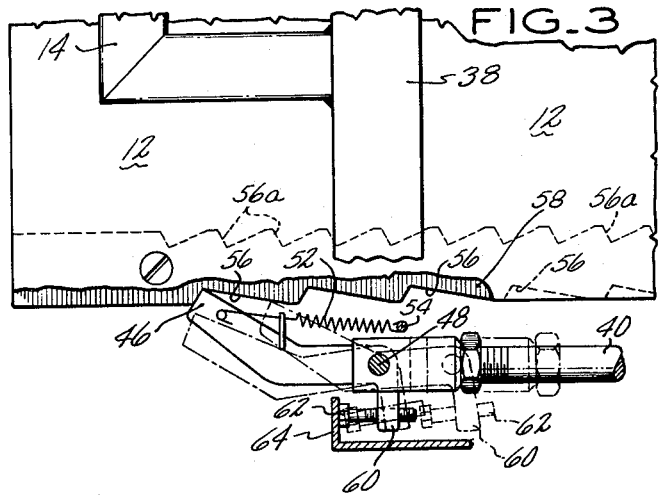
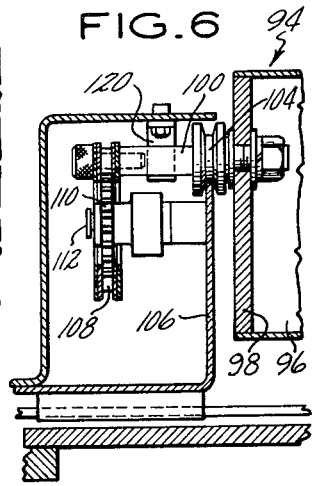
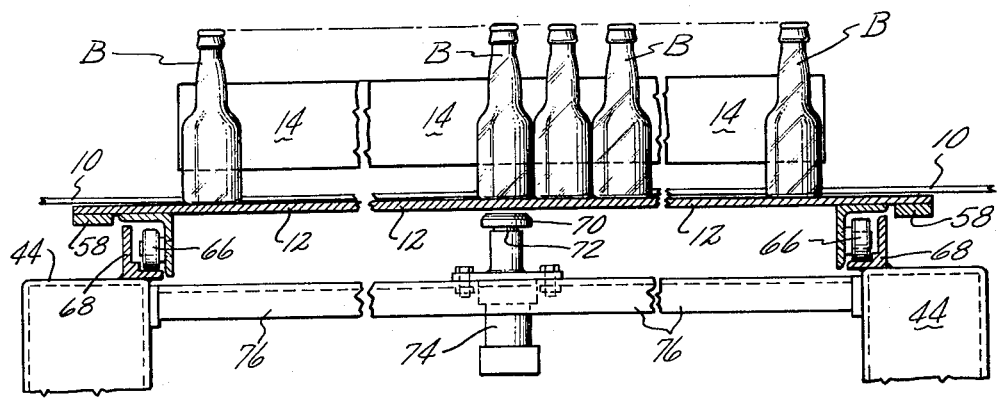

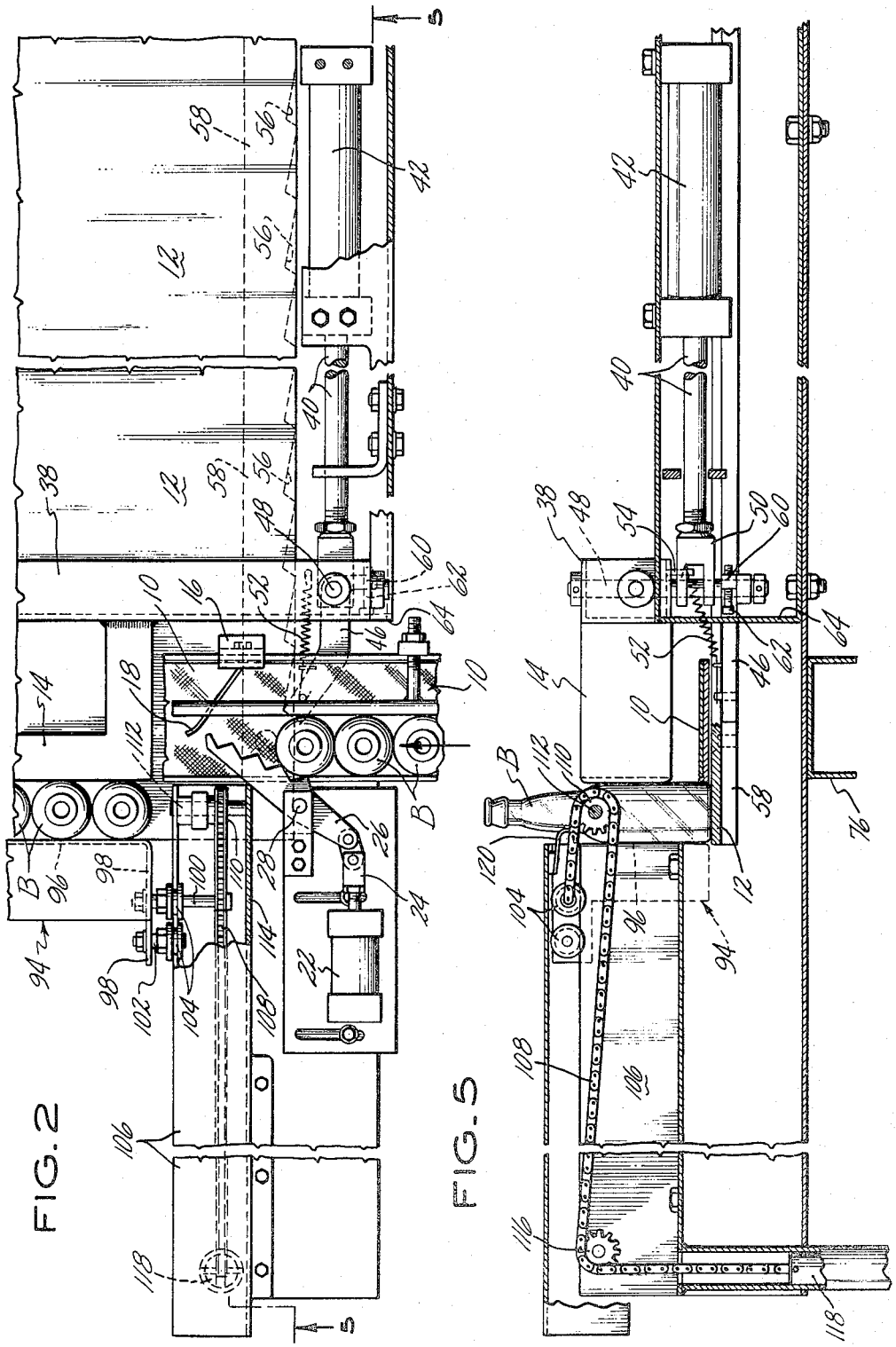

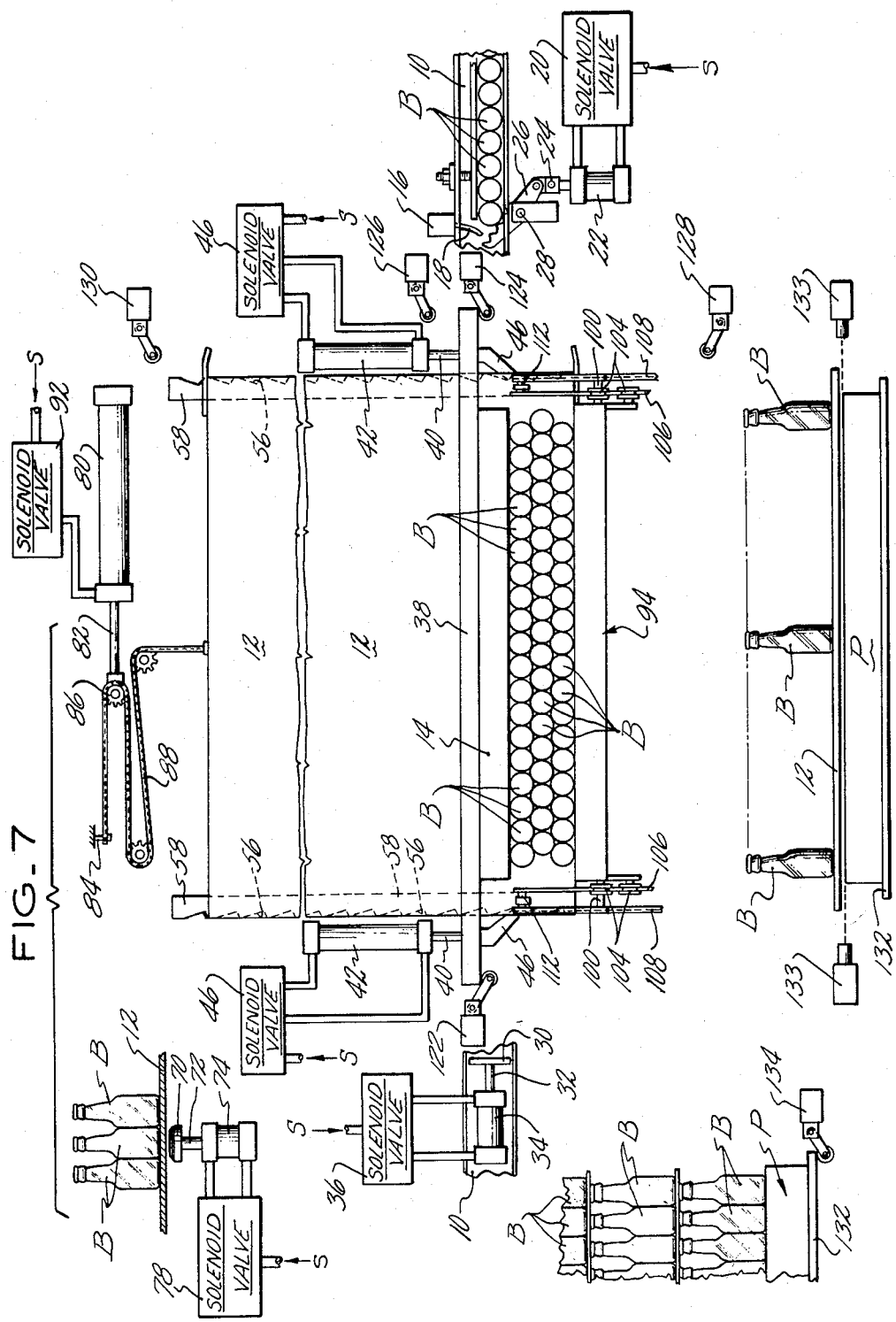

United States Patent Office 3,172,547
Patented Mar. 9, 1965

3,172,547
APPARATUS FOR STACKING ARTICLES ON PALLETS
Kaye B. Holstebroe, Portland, Conn., assignor to Emhart Corporation, Bloomfield, Conn., a corporation of Connecticut
Filed Dec. 7, 1961, Ser. No. 157,710
13 Claims. (Cl. 214—6)

This invention relates to an apparatus for taking articles (such as glassware tumblers or bottles) from an advancing single file row and arranging them in a plurality of side-by-side rows on a collecting platform to form a tier and for then transferring the tier onto a pallet or the like. Further, the apparatus operates to stack the articles, tier on tier, on the pallet.

As will be more fully described, the apparatus provided in accordance with the present invention operates in combination with a driven endless belt conveyor which delivers the articles to be stacked in upright single file order. A counting mechanism is employed to permit a preselected number of the articles to advance on the conveyor into position over a horizontal collecting plate forming a part of the apparatus. Then, no further conveyor movement of the articles is permitted while a pusher bar, moving transversely of the conveyor, sweeps the counted articles just off the conveyor and onto the collecting plate. The counted articles are thus arranged in a single row on the collecting plate against a vertically disposed steadying plate or back-up plate.

Then, the pusher bar is returned to its initial position and another counted group of the articles is permitted to advance into position in front of it. Then again the pusher bar is thrust forwardly to sweep the counted articles from the conveyor and the collecting plate is advanced with it to provide room for the articles being removed from the conveyor. The collecting plate and pusher are advanced just enough to thrust the second group or row off the conveyor and against the first collected row of articles. In doing this, the steadying plate is also advanced and continues to help support the articles in the upright position. Then, the pusher is retracted to its original position, but the collecting plate remains in its advanced position.

This operating sequence is repeated until the collecting plate, with a predetermined number of rows of articles thereon, has been advanced into position over a pallet. Then it is withdrawn while the pusher bar remains in extended position. This permits the collected rows or tier of articles to drop onto the pallet which is disposed immediately below the collecting plate, the articles being held in upright position all the while by engagement of the first row with the steadying plate and by engagement of the last row by the pusher.

Then, the pallet is lowered a distance at least equal to the height of the articles in the first tier, and the pusher bar and steadying plate are retracted to their initial positions. A separating sheet or board can then be placed over the first tier and the entire operation repeated to stack a second tier on top of the first tier. Obviously, the tiers can be stacked in any number as high as desired for easy handling on the pallet, because the tiers and interposed separating sheets cooperate to prevent toppling of the stacked articles.

It will be understood from the foregoing description that it is a general object of the invention to provide apparatus capable of high speed production operation to arrange articles arriving in a single line into multi-row layers or tiers on a pallet or the like and with a minimum of human effort, all the while handling the articles with such care that the apparatus can be used to advantage in stacking glassware or other fragile articles.

The drawings show a preferred embodiment of the invention and such embodiment will be described, but it will be understood that various changes may be made from the construction disclosed, and that the drawings and description are not to be construed as defining or limiting the scope of the invention, the claims forming a part of this specification being relied upon for that purpose.

Of the drawings:

FIG. 2 is an enlarged plan view of that portion of the apparatus which illustrates the infeed conveyor;

FIG. 3 is a further enlarged plan view of the drive means for the collecting plate or transfer plate;

FIG. 4 is a transverse sectional view through the collecting plate;

FIG. 5 is a longitudinal sectional view taken as indicated by the line 5—5 of FIG. 2;

FIG. 6 is an enlarged transverse sectional view taken as indicated by the line 6—6 of FIG. 1; and FIG. 7 is an exploded schematic view of the various elements of the apparatus to which reference will be had primarily for describing operation.

Figure 1:
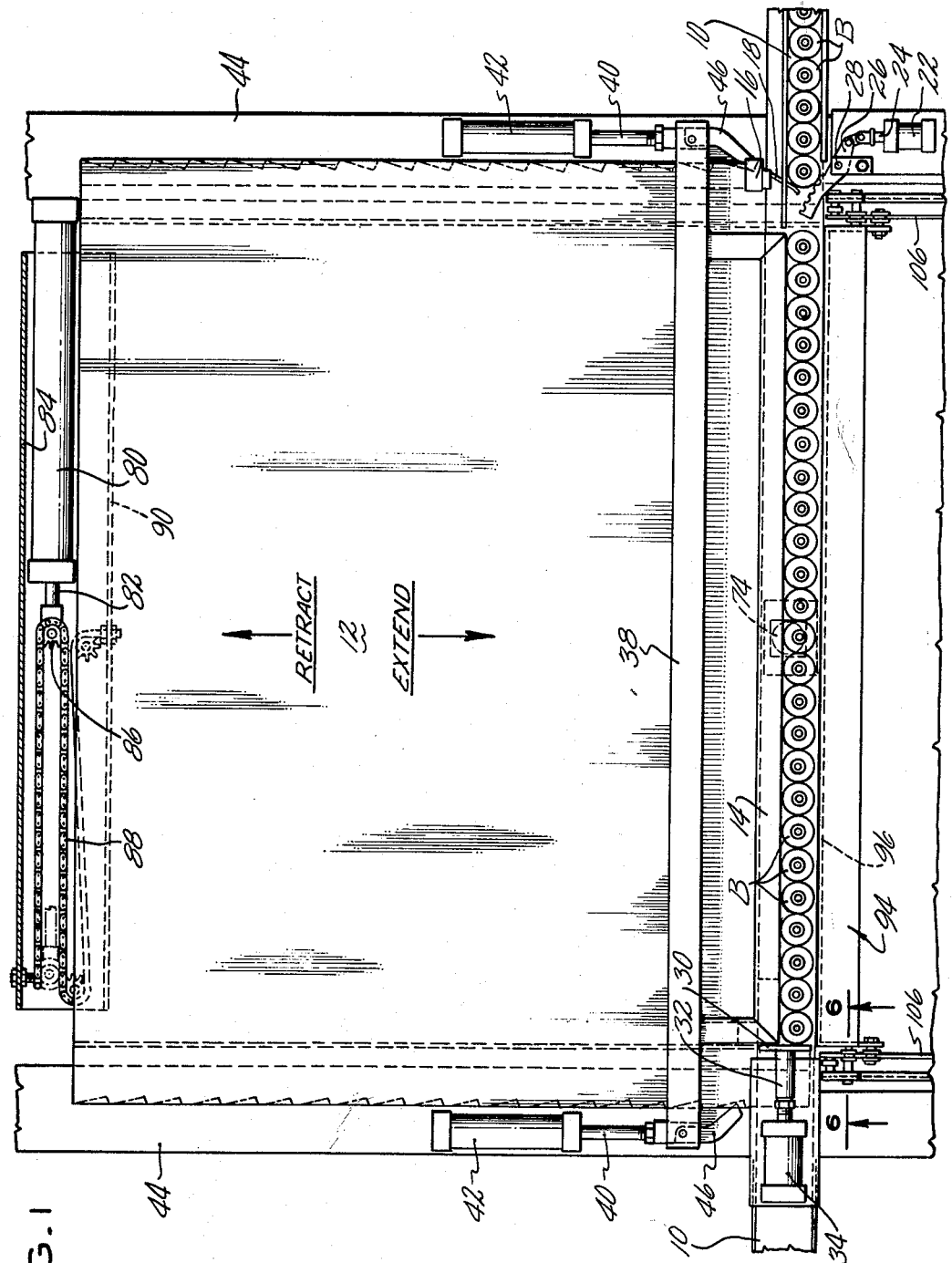
FIG. 1 is a fragmentary plan view of the apparatus incorporating the features of the present invention.

As has been mentioned, the apparatus of this invention operates in combination with an endless belt conveyor which delivers the articles to be palletized and stacked in upright single file order. In FIG. 1 the driven endless belt conveyor is indicated by the reference number 10 and it will be understood that this belt moves the articles from right to left. For purposes of illustration, a plurality of glass bottles B are shown as the articles which are transported by the conveyor belt 10 in upright order in a horizontal single row.

The upper extent of the endless belt 10 moves over a collecting plate or transfer plate which is reciprocable transversely of the conveyor in the directions indicated by the arrows in FIG. 1 to extend the said plate or to retract it. For purposes of reference, the path of reciprocation of the collecting or transfer plate 12 will be considered herein to be in the longitudinal direction of the apparatus.

As has also been mentioned, the apparatus includes a pusher bar 14 which is reciprocable longitudinally and thus transversely with respect to the conveyor belt and over the top of the conveyor belt to push articles such as the bottles B off the conveyor belt and onto the collecting plate when the pusher bar 14 is extended. Obviously, the pusher bar will thrust the bottles in a row onto the collecting plate, and it is desirable to maintain a selected number of bottles or other articles in each row thus formed on the collecting plate. Therefore, in keeping with the present invention, counting means is employed to permit only a selected number of bottles to be advanced by the conveyor 10 into position in front of the pusher bar 14 while the said bar is retracted.

This counting means includes a commercially available electric counter unit 16 which is an electrical device having an arm 18 engageable and movable by each bottle B being advanced by the conveyor 10 toward a position in front of the pusher bar 14. The unit 16 is so designed that it can be preset to operate an electric switch or relay after a selected number of bottles have engaged and moved the arm 18. This electric switch or relay means is included in an electrical control circuit (not shown) and when it is actuated as described, it in turn operates a solenoid valve 20 (FIG. 7) which controls a bottle stop actuating cylinder 22 (FIGS. 1, 2 and 7). The cylinder 22 is part of a fluid motor (preferably pneumatic) which includes a piston rod 24 pivotally connected to one end of a bottle stop arm 26 which is pivotally supported at 28 so that its other end can be projected into the path of the bottles being advanced on the conveyor 10.

It will be seen that when the counter unit 16 is actuated by reason of a selected number of bottles having engaged and moved its arm 18, the solenoid valve 20 is operated to cause the air cylinder 22 to retract the piston rod 24. This pivots the stop arm 26 in a clockwise direction to thrust its free end into the path of the advancing bottles adjacent an end of the pusher bar 14 so as to prevent more bottles being positioned in front of the pusher bar. The selected number of bottles which have passed the bottle stop 26 are advanced by the conveyor 10 until the foremost bottle engages a movable or adjustable stop means 30 adjacent the other end of the stop bar 14.

When the apparatus is used to arrange and stack round articles such as the bottles B, B, it is desirable that adjacent rows of the bottles be staggered with respect to each other so that a bottle in one row will be in nested relationship with adjacent bottles in adjacent rows, all as shown in FIG. 7. In order to accomplish this, the end stop 30 for the bottles positioned before the pusher bar 14 is made movable or adjustable as was mentioned.

More specifically, the stagger stop 30 comprises a plate secured to the end of a piston rod 32 extending from an air cylinder 34 forming a part of a fluid motor. The air cylinder is operated by a solenoid valve 36 (FIG. 7) so that the stop 30 and piston rod 32 may be retracted as shown in FIG. 1 to engage the foremost bottle in the first formed row and then extended to engage the foremost bottle in the second formed row. Thereafter, the stop is retracted for the third row, extended for the fourth row, etc. The operating sequence of the stagger stop 30 will be referred to again hereafter in connection with a description of the overall operation of the apparatus.

As has been mentioned, the pusher bar 14 is reciprocable transversely of and over the conveyor belt 10 in the longitudinal direction of the apparatus. The pusher bar 14 is shown in the retracted position in FIG. 1 and it is illustrated schematically in its extended position in FIG. 7. The said pusher bar is secured to a beam or rail 38 (FIGS. 1 and 7) which extends transversely of the apparatus with its respective ends projecting beyond the longitudinal edges of the collecting or transfer plate 12. The respective extending ends of the rail 38 are connected to the ends of a pair of piston rods 40, 40 extending from air cylinders 42, 42 mounted on longitudinally extending frame members 44, 44. As shown in FIG. 7, the respective air cylinders 42, 42 are controlled by solenoid valves 46, 46 so as to extend the piston rods 40, 40 or to retract them and thus to respectively extend and retract the rail 38 and pusher bar 14. The control means for the solenoid valves 46, 46 will be mentioned hereinafter in connection with a description of the overall operation.

As best shown in FIGS. 2–5, a pivotal pawl 46 is connected with the end of each piston rod, this pawl forming a part of a one-way drive structure that advances or extends the collecting plate 12 an increment for each extension of the pusher bar 14. As best shown in FIGS. 2 and 5, the pawl 46 is disposed below the conveyor belt 10 and the collecting plate, being pivotally mounted on a vertical pin or rod 48 which is secured to the transversely extending rail 38 and which is also supported in a clevis 50 on the end of the piston rod 40 with which the pawl is associated. A spring 52 is connected with each pawl 46 and with a pin 54 depending from the rail 38 to bias the associated pawl inwardly or toward the adjacent edge of the collecting plate 12 and immediately therebelow. Thus, the biased pawl can engage any one of a longitudinally extending series of ratchet teeth 56, 56 provided in a strip 58 secured to the under side of the collecting plate 12 and extending along its longitudinal edge, there being one such strip provided for each longitudinal edge of the plate. Thus, as the piston rods 40, 40 are extended to extend the rail 38 and pusher bar 14, their associated pawls 46, 46 engage the ratchet teeth in the strips 58, 58 and advance or extend the collecting plate one increment with the extension of the pusher bar.

Obviously, the collecting plate is extended with each reciprocation of the pusher bar so that it will extend transversely of the conveyor 10 and on one side thereof to receive the bottles B, B being pushed from the conveyor. Since the collecting plate or transfer plate is extended an equal amount for each extension of the pusher bar, enough of its surface is exposed so that each row of bottles being pushed from the conveyor onto the collecting plate will be arranged in close side-by-side relationship with the other rows of bottles. Therefore, the spacing of the ratchet teeth 56, 56 is selected to provide for an increment of movement of the collecting plate 12 in keeping with the diameter or other transverse dimension of the bottles or other articles being removed from the conveyor. Preferably, the strips 58, 58 are provided as shown in FIG. 3 with the ratchet teeth 56, 56 along one edge thereof spaced a known distance apart while the other longitudinal edge of each such strip has a series of ratchet teeth 56a, 56a which are spaced a different distance apart. Thus, by reversing transversely the position of each strip on the collecting plate, an adjustment can be made for the movement of the collecting plate. Obviously, other substitute strips can be provided to accommodate articles of different size.

In further keeping with the present invention, the pawls 46, 46 are arranged to be disengaged after the pusher bar and collecting plate have been extended by the air cylinders 42, 42 and piston rods 40, 40. That is, each pawl 46 has an outwardly projecting leg 60 thereon which carries an adjustable stop screw 62. Just prior to the time that the associated piston rod 40 has reached the full extent of its stroke, the stop screw 62 will engage a frame member 64 to start to pivot the pawl as illustrated in FIG. 3. That is, the pawl 46 will be pivoted from the full line position shown in FIG. 3 to the left-hand broken line position wherein it is disengaged from the associated ratchet teeth 56. Thereafter, when the piston 40 is retracted, the pawl will move back over the ratchet teeth as shown by the right-hand broken line position of FIG. 3. The purpose of having the respective pawls become disengaged from their associated ratchet teeth at the end of the piston strokes is to permit the collecting plate to be retracted after a selected number of strokes and after it has been advanced to its full extent. This will be mentioned again hereinafter.

As will be observed in connection with FIG. 4, the collecting or transfer plate 12 is supported near its longitudinal edges on rollers 66, 66 movable along longitudinal tracks 68, 68 carried on the frame members 44, 44. It should also be observed that a brake 70 is provided to hold the collecting plate 12 against movement in any position which it assumes. This brake is preferably in the form of a plate located on the upper end of a vertically extending piston rod 72 which can be extended and retracted by action of an air cylinder 74. The air cylinder 74 is supported on a transversely disposed frame member 76 and its operation is controlled by a solenoid valve 78 (FIG. 7). The operation of the brake to hold the plate 12 in designated positions will be described hereinafter in connection with a description of the general operation.

The collecting and transfer plate 12 is retractible by means comprising an air cylinder 80 (FIGS. 1 and 7) operating a piston 82. This air cylinder is mounted on one of the frame members 44 and on an additional frame member 84 so that its piston can be extended and retracted transversely of the plate 12. A sprocket 86 is rotatably supported on the end of the piston 82 to engage a chain 88 having one end secured to the frame member 84 and the other end secured to an angle iron bar 90 on the rear end of the collecting plate 12.

As can be seen by reference to FIGS. 1 and 7, when the collecting and transfer plate 12 is extended increment by increment by reason of the reciprocation of the pusher bar 14, it will cause the piston 82 to be extended from the air cylinder 80. Then, when the collecting plate is to be retracted, a solenoid valve 92 is opened so that the air cylinder 80 will retract the piston 82 and thus retract the collecting plate.

As the plate 12 is extended increment by increment due to the repeated reciprocations of the pusher bar 14, it receives the series of rows of bottles in side-by-side relationship, and it is desirable to have some means preventing the bottles from toppling while on the plate and during movement thereof. In the preferred form of the invention, this steadying means comprises a channel-shaped member 94 (see FIGS. 5 and 6) having a web which provides a vertical plate 96 extending transversely of the apparatus and thus parallel to the conveyor belt 10 and adjacent thereto. The ends of this transversely extending channel member are closed by vertical end plates 98, 98 each of which supports a horizontal outwardly extending pair of shafts 100, 102. These pairs of shafts at each end respectively support a pair of rollers 104, 104 which roll along the top edge of a frame plate 106 extending longitudinally at each side of the apparatus.

The foremost shaft 100 of each pair of roller shafts extends outwardly, and the extending end is secured to one end of a chain 108. The chain 108 is entrained over a sprocket 110 rotataby supported on a shaft 112 which extends horizontally between the frame plate 106 and a parallel frame plate 114. The chain then extends forwardly and is entrained over a sprocket 116 rotatably supported by the frame plate 106 and the end of the chain is secured to a counterbalance weight 118 (FIG. 5). As will be noted, the weight 118 at each side of the steadying plate 96 tends to pull the said steadying plate toward the conveyor 10. However, as a row of bottles is pushed from the conveyor onto the collecting plate 12, the said row engages the steadying plate or back-up plate 96 to move it forwardly. Further, as each succeeding row of bottles is pushed onto the collecting plate, the steadying plate will be extended or advanced too. Obviously, when the bottles are lowered from engagement with the steadying plate, it is returned to its initial position shown in FIG. 1 by means of the weights 118, 118. A stop 120 is arranged to engage each shaft 100 at each end of the steadying plate to retain the steadying plate in its aforesaid position.

The remaining elements of the apparatus will now be described primarily with reference to FIG. 7 in connection with a description of the overall operation of the device.

Assume at the outset that the article or bottle stop arm 26 is retracted and that the stagger stop 30 is also retracted and that the infeed conveyor 10 is being operated with upright bottles set thereon. The conveyor 10 will move the bottles into position over the collecting plate 12 and in front of the pusher bar 14. As the bottles pass the counting unit 16, each bottle will engage and displace the counting unit arm 18 so that they will be counted as they pass thereby. After the desired or preselected number of bottles have passed the counting unit 16, it will operate to actuate the pusher bar reciprocating cylinders 42, 42, the bottle stop arm operating cylinder 22 and the brake cylinder 74. This will occur at about the time that the foremost bottle of those which have passed the counting unit 16 on the conveyor 10 engages the retracted stagger stop 30.

More specifically, the electrical counting unit 16 when operated will close a circuit to energize the solenoid valve 20 to retract the piston 24 and thus to project the free end of the pivoted stop arm 26 into the path of the moving bottle, as shown in FIG. 7. This will prevent additional bottles from moving into position over the collecting plate and in front of the pusher bar. At the same time, the counting unit will close a circuit or circuits including the solenoid valves 46, 46 to cause the pusher bar actuating cylinders 42, 42 to extend their pistons 40, 40 and thus to extend the pusher bar 14. Further, and at the same time, the counting unit 16 will close an electric circuit including the solenoid valve 78 which will thereupon retract its piston rod 72 and disengage the brake plate 70 from the collecting plate 12 so that it can be extended one increment with the extension of the pusher bar.

When the pusher bar 14 and collecting plate 12 have been extended a distance sufficient to remove a row of bottles from the conveyor belt and place them on the collecting plate, the rail 38 which is movable with the pusher bar engages a pair of limit switches 122 and 124 at its opposite ends. The limit switch 122 when thus engaged and operated opens the circuit to the solenoid valve 78 so that the brake plate 70 will be thrust upwardly and engage and arrest further movement of the collecting plate 12. At substantially the same time, the limit switch 124 opens the circuit or circuits to the solenoid valves 46, 46, so that the air cylinders 42, 42 will be reversed to retract the pusher bar 14. When the pusher bar 14 is retracted, the rail 38 engages and operates a limit switch 126 which thereupon opens a switch in the circuit to the solenoid valve 20 to retract the pivoted arm 26 from position so that more bottles can be moved by the conveyor into position before the pusher bar. At substantially the same time, the limit switch 126 opens a circuit to the solenoid 36 so that the air cylinder 34 will be operated to advance the stagger stop 30 to engage the row of bottles being advanced into position in front of the pusher bar. That pole of the limit switch 126 controlling the solenoid valve 36 is of the sequencing type which will extend the stagger stop 30 every other time that the limit switch 126 is engaged and actuated by the rail 38.

The foregoing operations will be repeated until the collecting plate 12 has been extended a desired distance with a selected number of rows of bottles thereon to form a load group tier. When so extended, the collecting plate 12 will engage and actuate a limit switch 128. When the limit switch 128 is actuated as described, it will do three things. That is, it will prevent the pusher bar 14 from being retracted, it will prevent the brake 70 from being engaged, and it will cause the collecting plate 12 to be retracted. More specifically, when the limit switch 128 is actuated, it will maintain the circuit or circuits to the solenoid valves 46, 46 in closed condition and it will maintain the circuit to the solenoid 78 in closed condition while it closes a circuit to the solenoid valve 92 so that the air cylinder 80 will retract the piston 82 and thus retract the collecting plate 12. Before the collecting plate 12 is fully restored to its retracted position, it will engage a limit switch (not shown) that will open the circuit to the solenoid valve 78 and thus permit the brake 70 to engage the collecting plate 12 to slow down and finally to stop its movement.

When the collecting plate 12 is fully retracted, it will engage and actuate a limit switch 130 to close a circuit to an electric motor (not shown) which operates to lower a pallet elevator 132 (FIG. 7).

The elevator 132 supports a pallet upon which the bottles are to be stacked, and the elevator is initially at the required height so that the pallet P will be positioned immediately below the extended collecting plate 12. Thus, when the collecting plate is retracted, the bottles will drop a slight distance therefrom onto the pallet. When the elevator has been lowered a distance equal to or slightly more than the bottle height, a light beam will be restored between a pair of photocell units 133, 133 (FIG. 7), and upon restoration of this light beam, the elevator circuit will be opened to prevent further lowering of the elevator. Thus, the first tier of bottles will now be positioned immediately below the collecting plate when it is extended. In this position of the elevator, a chipboard or paperboard can be placed over the first tier of bottles to provide platform support for the next tier of bottles which is formed by a repetition of the operations described above. It is desirable in forming the second tier and each subsequent tier of bottles that the stagger stop 30 be operated in the same sequence as with the first tier. This being the case, the vertical arrangement of the tiers will be such as to provide a bottle over a bottle in the next lower tier.

When the tier of bottles is lowered by the elevator, the steadying means or back-up plate 96 is released so that it can return to its original position by the force of the balance weights 118, 118. Further, the pusher bar will be returned to its original position upon actuation of the limit switch 130 by the return of the collecting plate 12. That is, another pole of the limit switch 130 will operate to open the circuit to the solenoid valves 46, 46.

The tier forming and bottle stacking operations described above will continue until pallet P is loaded with a desired number of layers or tiers of the bottles. When the desired number has been reached, the elevator will be lowered to a position wherein it engages and actuates a limit switch 134. This switch includes a pole in a circuit that will bypass the photocell units 133, 133 and the elevator will be still further lowered.

The elevator can be lowered to a position wherein it places the pallet P, which is now loaded, upon a take-away conveyor which will remove the loaded pallet from the apparatus. The same conveyor can be employed to bring a new pallet into position on the elevator which can then be raised and the entire sequence of operations started again.

The invention claimed is:

1. In apparatus for taking upright articles from a conveyor and for arranging them on a pallet, the combination comprising a collecting plate movable transversely of and below the conveyor, a pusher bar reciprocable transversely of and over the conveyor and operable when extended to push articles off the conveyor and into a row on the collecting plate, the bar then being retractible to a position for engagement with subsequent articles on the conveyor so that repeated reciprocation thereof will arrange articles on the collecting plate in a series of side-by-side rows to form a tier, means interconnecting the pusher bar and the collecting plate so that the plate will be moved with the bar only during extension thereof to provide room for each row of articles being removed from the conveyor, and means for retracting the plate while the bar is extended after moving a desired number of rows of articles onto the collecting plate, whereby the articles will drop onto a pallet positioned below the collecting plate when extended.

2. In apparatus for taking upright articles from a conveyor and for arranging them on a pallet, the combination comprising a collecting plate movable transversely of and below the conveyor, a pusher bar reciprocable transversely of and over the conveyor and operable when extended to push articles off the conveyor and into a row on the collecting plate, the bar then being retractible to a position for engagement with subsequent articles on the conveyor so that repeated reciprocation thereof will arrange articles on the collecting plate in a series of side-by-side rows to form a tier, means interconnecting the pusher bar and the collecting plate so that the plate will be moved with the bar only during extension thereof to provide room for each row of articles being removed from the conveyor, said means comprising a longitudinal series of ratchet teeth on the collecting plate and a pawl engageable therewith and carried by the bar, means for disengaging said pawl when the bar is extended, and means for retracting the plate while the bar is extended after moving a desired number of rows of articles onto the collecting plate, whereby the articles will drop onto a pallet positioned below the collecting plate when extended.

3. In apparatus for taking upright articles from a conveyor and for arranging them on a pallet, the combination comprising a collecting plate movable transversely of and below the conveyor, a pusher bar reciprocable transversely of and over the conveyor and operable when extended to push articles off the conveyor and into a row on the collecting plate, the bar then being retractible to a position for engagement with subsequent articles on the conveyor so that repeated reciprocation thereof will arrange articles on the collecting plate in a series of side-by-side rows to form a tier, a generally vertical plate disposed over the collecting plate for engagement by the first row of articles moved onto the collecting plate and for movement therewith as subsequent rows are advanced in forming the tier so as to prevent toppling of the articles, a longitudinal series of ratchet teeth on the collecting plate, a pawl carried on the bar engageable with said ratchet teeth to advance the collecting plate each time the bar is extended to provide room for the rows of articles, means disengaging said pawl in the extended position of the bar, and means for retracting the collecting plate while the bar is extended after moving a desired number of rows of the articles onto the collecting plate, whereby the articles will drop onto a pallet positioned below the collecting plate when extended.

4. In apparatus for taking upright articles from a conveyor and for arranging them on a pallet, the combination comprising a collecting plate movable transversely of and below the conveyor, a pusher bar reciprocable transversely of and over the conveyor and operable when extended to push articles off the conveyor and into a row on the collecting plate, the bar then being retractible to a position for engagement with subsequent articles on the conveyor so that repeated reciprocation thereof will arrange articles on the collecting plate in a series of side-by-side rows to form a tier, a generally vertical plate engageable by the first row of articles on the collecting plate and movable therewith as subsequent rows are added to prevent the articles from toppling, means interconnecting the pusher bar and the collecting plate so that the plate will be moved with the bar only during extension thereof to provide room for each row of articles being removed from the conveyor, said means comprising a longitudinal series of ratchet teeth on the collecting plate and a pawl engageable therewith and carried by the bar, means for disengaging said pawl when the bar is extended, and means for retracting the plate while the bar is extended after moving a desired number of rows of articles onto the collecting plate, whereby the articles will drop onto a pallet positioned below the collecting plate when extended.

5. Apparatus for moving upright articles from a conveyor onto a pallet and comprising a collecting plate movable transversely of and below the conveyor, a pusher bar reciprocable transversely of and over the conveyor so that when extended it will push articles off the conveyor and onto the plate in a row and when retracted it will be positioned to engage subsequent articles on the conveyor whereby repeated reciprocation of the bar will form the articles in a series of side-by-side rows on the plate, means permitting only a selected number of articles to be moved by the conveyor into position for engagement by the bar and only when the bar is retracted, one way drive means interconnecting the bar and plate to advance the plate in increments only when the bar is extended, and means for retracting the plate when the bar is extended after moving a desired number of rows of the articles onto the plate, whereby the articles will drop onto a pallet positioned below the plate when extended.

6. Apparatus for moving upright articles from a conveyor onto a pallet and comprising a collecting plate movable transversely of and below the conveyor, a pusher bar reciprocable transversely of and over the conveyor so that when extended it will push articles off the conveyor and onto the plate in a row and when retracted it will be positioned to engage subsequent articles on the conveyor whereby repeated reciprocation of the bar will form the articles in a series of side-by-side rows on the plate, adjustable stop means for positioning articles on the conveyor for engagement by the pusher bar so that adjacent rows of articles on the plate will be in staggered relationship and whereby round articles in adjacent rows will be engaged in nested relationship, one way drive means interconnecting the bar and plate to advance the plate an increment with each extension of the bar, and means for retracting the plate when the bar is extended after moving a desired number of rows of the articles onto the plate, whereby the articles will drop onto a pallet positioned below the plate when extended.

7. Apparatus for moving upright articles from a conveyor onto a pallet and comprising a collecting plate movable transversely of and below the conveyor, a pusher bar reciprocable transversely of and over the conveyor to push articles therefrom onto the plate whereby a series of such reciprocations forms the articles in a series of side-by-side rows on the plate, means permitting only a selected number of articles to be moved into position for engagement by the bar whereby each of the formed rows contains the same number of articles, adjustable stop means for positioning articles on the conveyor for engagement by the pusher bar so that adjacent rows of articles on the plate will be in staggered relationship and whereby round articles in adjacent rows will be engaged in nested relationship, one way drive means interconnecting the bar and plate to advance the plate an increment with each extension of the bar, and means for retracting the plate when the bar is extended after moving a desired number of rows of the articles onto the plate, whereby the articles will drop onto a pallet positioned below the plate when extended.

8. Apparatus for moving upright articles from a conveyor onto a pallet and comprising a collecting plate movable transversely of and below the conveyor, a pusher bar reciprocable transversely of and over the conveyor to push articles therefrom onto the plate whereby a series of such reciprocations forms the articles in a series of side-by-side rows on the plate, generally vertical steadying means disposed over the collecting plate for engagement by the first row of articles moved onto the collecting plate and for movement therewith after subsequent rows are advanced so as to prevent toppling of the articles, means permitting only a selected number of articles to be moved into position for engagement by the bar whereby each of the formed rows contains the same number of articles, adjustable stop means for positioning articles on the conveyor for engagement by the pusher bar so that adjacent rows of articles on the plate will be in staggered relationship and whereby round articles in adjacent rows will be engaged in nested relationship, one way drive means interconnecting the bar and plate to advance the plate an increment with each extension of the bar, and means for retracting the plate when the bar is extended after moving a desired number of rows of the articles onto the plate, whereby the articles will drop onto a pallet positioned below the plate when extended.

9. Apparatus for removing articles from a conveyor and stacking them on a pallet and comprising a collecting plate movable transversely of and below the conveyor, a pusher bar reciprocable transversely of and over the conveyor to push articles therefrom onto the plate whereby a series of such reciprocations forms the articles in a series of side-by-side rows comprising a tier on the plate, one way drive means interconnecting the bar and plate to extend the plate an increment with each extension of the bar, means for retracting the plate when the bar is extended after moving the last row of a tier onto the plate, whereby the articles will drop onto a pallet positioned below the extended plate, and an elevator for adjustably supporting the pallet below the plate, first immediately below the plate to receive the first formed tier and then at successively lower elevations to receive successively formed tiers in stacked relationship.

10. Apparatus for removing articles from a conveyor and stacking them on a pallet and comprising a collecting plate movable transversely of and below the conveyor, a pusher bar reciprocable transversely of and over the conveyor to push articles therefrom onto the plate whereby a series of such reciprocations forms the articles in a series of side-by-side rows comprising a tier on the plate, one way drive means interconnecting the bar and plate to extend the plate an increment with each extension of the bar, means permitting only a selected number of articles to be moved into position for engagement by the bar whereby each of the formed rows contains the same number of articles, adjustable stop means for positioning articles on the conveyor for engagement by the pusher bar so that adjacent rows of articles on the plate will be in stacked relationship and whereby round articles in adjacent rows will be engaged in nested relationship, means for retracting the plate when the bar is extended after moving the last row of a tier onto the plate whereby the article will drop onto a pallet positioned below the plate, and an elevator for adjustably supporting the pallet below the plate, first immediately below the plate to receive the first formed tier and then at successively lower elevations to receive successively formed tiers in stacked relationship.

11. Apparatus for taking upright articles from a conveyor and for arranging them on a pallet comprising a collecting plate movable transversely of and below the conveyor, a pusher bar reciprocable transversely of and over the conveyor and operable when extended to push articles off the conveyor and into a row on the collecting plate, the bar then being retractible to a position for engagement with subsequent articles on the conveyor so that repeated reciprocation thereof will arrange articles on the collecting plate in a series of side-by-side rows to form a tier, a generally vertical plate disposed over the collecting plate for engagement by the first row of articles moved onto the collecting plate and for movement therewith as subsequent rows are advanced in forming the tier so as to prevent toppling of the articles, means interconnecting the pusher bar and the collecting plate so that the collecting plate will be moved with the bar only during extension thereof to provide room for each row of articles being removed from the conveyor, and means for retracting the collecting plate while the bar is extended after moving a desired number of rows of articles onto the collecting plate, whereby the articles will drop onto a pallet positioned below the collecting plate when extended.

12. Apparatus for removing articles from a conveyor and placing them on a pallet and comprising a collecting plate extensible in increments transversely of the conveyor from one side thereof, reciprocating means for moving the articles transversely of the conveyor one row at a time toward the one side thereof and onto the plate in side-by-side rows and having means engageable with the plate for simultaneously extending the plate an increment with each row moved, and means for retracting the plate after the articles have been formed in a desired number of rows thereon, whereby the articles will drop onto a pallet positioned below the extended collecting plate.

13. Apparatus for removing articles from a conveyor and placing them on a pallet and comprising a collecting plate extensible in increments transversely of the conveyor from one side thereof, reciprocating means for moving the articles transversely of the conveyor one row at a time toward the one side thereof and onto the plate in side-by-side rows and having means engageable with the plate for simultaneously extending the plate an increment with each row moved, means for retaining the articles in the formed rows, and means for retracting the plate from below the formed rows, whereby the articles will drop onto a pallet positioned below the extended collecting plate.

References Cited in the file of this patent

UNITED STATES PATENTS

| | | |
|---|---|---|
| 2,470,795 | Socke | May 24, 1949 |
| 2,701,650 | Stevenson | Feb. 8, 1955 |
| 2,703,182 | Broberg | Mar. 1, 1955 |
| 2,765,599 | Johnson | Oct. 9, 1956 |
| 2,774,489 | Guigas | Dec. 18, 1956 |
| 2,946,465 | Raynor | July 26, 1960 |
| 2,979,872 | Verrinder | Apr. 18, 1961 |